US 6,589,358 B1

(12) United States Patent
Suehiro

(10) Patent No.: US 6,589,358 B1
(45) Date of Patent: Jul. 8, 2003

(54) METHOD AND APPARATUS FOR CLEANING AN ARTICLE

(75) Inventor: Keiichi Suehiro, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 09/605,764

(22) Filed: Jun. 28, 2000

(30) Foreign Application Priority Data

Jun. 30, 1999 (JP) ............................... 11-186642
May 12, 2000 (JP) ........................... 2000-139892

(51) Int. Cl.[7] ................... B08B 3/04; C23G 1/36
(52) U.S. Cl. .................... 134/10; 134/13; 134/26; 134/104.1; 134/104.4; 134/111
(58) Field of Search ........................ 134/10, 13, 26, 134/111, 104.1, 104.4

(56) References Cited

U.S. PATENT DOCUMENTS 5,174,315 A * 12/1992 Hellstern et al. ............. 134/60
5,354,466 A * 10/1994 Yunoki .................. 210/321.69
5,833,867 A * 11/1998 Hensley ..................... 210/792

FOREIGN PATENT DOCUMENTS

| JP | 60-102905 | 6/1985 |
| JP | 6-039375 | 2/1994 |
| JP | 10-109074 | 4/1998 |

* cited by examiner

Primary Examiner—Zeinab El-Arini
(74) Attorney, Agent, or Firm—Harness, Dickey & Pierce, P.L.C.

(57) ABSTRACT

A cleaning apparatus includes cleaning vessels 2a and 2b for storing cleaning water "W1" used for cleaning an article to be cleaned 14; concentrating vessels 3a and 3b for storing sewage "W2" discharged from the cleaning vessels; an ultrafiltration membrane 11 for receiving the sewage "W2" discharged from the concentrating vessels to separate the received sewage into filtered water "W3" and concentrated sewage "W5"; and waterway lines "L4" and "L12" for returning the concentrated sewage "W5" discharged from the ultrafiltration membrane 11 to the concentrating vessels 3a and 3b. The filth is removed from the article to be cleaned 14 by dipping the article to be cleaned 14 into the cleaning water "W1". The ultrafiltration membrane 11 is provided with a backwash filtration system "L9", "B4", and "P3" for removing filthy refuse.

7 Claims, 2 Drawing Sheets

METHOD AND APPARATUS FOR CLEANING AN ARTICLE

BACKGROUND OF THE INVENTION

1. Industrial Field of the Invention

The present invention relates to a cleaning apparatus for removing filth from an article to be cleaned and a cleaning method, and more specifically, it relates to a manufacturing method for a liquid crystal apparatus having a cleaning process.

2. Description of the Related Art

In various industrial fields, when an objective product is manufactured, filth may adhere to the product, an apparatus having the product, a jig used for manufacturing the product, and so forth. The filth has to be removed from the product and so forth at an appropriate point in time.

For example, when the manufacturing process of a liquid crystal apparatus is supposed, which is an apparatus for displaying the information such as characters, numerals, and patterns by using liquid crystal as a light modulating element, unnecessary liquid crystal may adhere as filth to a finished liquid crystal panel, a liquid crystal apparatus having the liquid crystal panel, a jig used during the manufacturing thereof, and so forth. Such filth is required to be removed at an appropriate point in time.

As a cleaning apparatus for removing filth, an ultrasonic cleaning apparatus using a fluorocarbon solvent is known. In the cleaning apparatus, an article to be cleaned is dipped in a storing vessel storing a fluorocarbon solvent and in which ultrasonic vibration is applied to remove filth from the article to be cleaned.

However, the above-mentioned conventional cleaning apparatus involves problems that an expensive complicated treatment apparatus specially designed for preventing air pollution due to the fluorocarbon and the like is required and an expensive complicated treatment apparatus specially designed for preventing the removed filth from being discharged as waste water is also needed, etc.

Meanwhile, when a liquid crystal apparatus is cleaned, a cleaning apparatus such as an apparatus disclosed in Japanese Unexamined Patent Application Publication No. 7-13115 is adopted. In this apparatus, liquid crystal can be readily separated and removed from cleaning fluid mixing the liquid crystal therewith by cleaning using an ultrafiltration membrane. The cleaning apparatus utilizing the ultrafiltration membrane comprises a cleaning vessel containing cleaning liquid made of an aqueous solution therein and a vibrator arranged in the bottom of the cleaning vessel to be excited by an oscillator, wherein an article to be cleaned such as a glass substrate having liquid crystal adhering thereto is dipped into the cleaning liquid in the cleaning vessel.

The liquid crystal adhering on the surface of the dipped glass substrate is cleaned off the substrate by ultrasonic waves generated by excitation of the vibrator and as well as by detergency of the cleaning liquid. The cleaning liquid mixing the liquid crystal therewith overflows to an annular trough attached to the upper wall of the cleaning vessel to be conveyed to a liquid crystal concentrating vessel via piping. The solution in the concentrating vessel is pressurized by driving of a pump to be fed to the ultrafiltration membrane, to whereby be separated into an emulsionized liquid crystal constituent in the solution and the substantially pure cleaning liquid. Since the separated substantially pure cleaning liquid is recirculated to the cleaning vessel, the reuse of the cleaning liquid and the recovery of the liquid crystal can be achieved.

However, in the cleaning method and the cleaning apparatus, during the using the cleaning liquid repeatedly by separating the cleaning liquid into the liquid crystal in the solution and the substantially pure cleaning liquid by using the ultrafiltration membrane, filthy refuse settles gradually on the internal surface of the ultrafiltration membrane to reduce the separating capacity for the filtered water. Due to the reduced separating capacity, the cleaning liquid circulates in a state of containing filth such as the liquid crystal, so that the cleaning of the cleaning liquid in the cleaning vessel cannot be efficiently achieved. Also, the structure of the cleaning apparatus is insufficient for the cleaning.

In view of the above-mentioned problem, the present invention has been made and it is an object thereof to provide a cleaning apparatus capable of securely and efficiently removing filth from the cleaning liquid repeatedly used by recycling for a long time without using harmful liquid such as a fluorocarbon, moreover by a simplified treatment system, so that an article to be cleaned can be sufficiently cleaned with fresh cleaning liquid having a small amount of filth.

SUMMARY OF THE INVENTION (1) In order to achieve the above-mentioned object, in a cleaning apparatus for removing filth from an article to be cleaned, a cleaning apparatus according to the present invention comprises a cleaning vessel for storing cleaning water used for cleaning the article to be cleaned; a concentrating vessel for storing sewage discharged from the cleaning vessel; an ultrafiltration membrane for receiving the sewage discharged from the concentrating vessel to separate the received sewage into filtered water and concentrated sewage; a waterway line for returning the concentrated sewage discharged from the ultrafiltration membrane to the concentrating vessel; and a backwash filtration system for flushing the ultrafiltration membrane backward with liquid from the filtered water side toward the sewage.

In the structure described above, arbitrary articles may be supposed as an article to be cleaned; for example, a liquid crystal apparatus for displaying the information such as characters, numerals, and patterns by using liquid crystal as a light modulating element; a liquid crystal panel forming a principal part of the liquid crystal apparatus; and a jig used during the manufacturing the liquid crystal apparatus.

Various substances may also be supposed to be the filth; for example, there are unnecessary liquid crystal adhering to external surfaces of the liquid crystal apparatus and the jig, and so forth. The liquid crystal is a substance that cannot be dumped at an arbitrary place without permission.

In a cleaning apparatus according to the present invention, the cleaning is performed with water without using harmful liquid such as a fluorocarbon or a specific detergent, so that there are no worries of external environmental pollution. Since the concentrated sewage discharged from the filtration means is returned to the concentrating vessel, the filth such as liquid crystal cannot be externally discharged, and moreover an amount of waste liquid can be reduced.

Furthermore, since the backwash filtration system is provided in the ultrafiltration membrane, the filth in the circulating cleaning liquid being repeatedly used can be efficiently and securely removed therefrom for a long period. Thereby, an article to be cleaned can be cleaned with substantially pure water at all times. Also, an article to be cleaned can be sufficiently cleaned with fresh cleaning liquid having a small amount of filth.

(2) In a cleaning apparatus for removing filth from an article to be cleaned, another cleaning apparatus according to the present invention comprises a cleaning vessel for storing cleaning water used for cleaning the article to be cleaned; a concentrating vessel for storing sewage discharged from the cleaning vessel; an ultrafiltration membrane for receiving the sewage discharged from the concentrating vessel to separate the received sewage into filtered water and concentrated sewage; and a waterway line for returning the concentrated sewage discharged from the ultrafiltration membrane to the concentrating vessel, wherein a plurality of the ultrafiltration membranes are arranged in parallel with each other in a waterway line starting from the concentrating vessel.

According to this cleaning apparatus, the treatment capacity for filtering the sewage can be increased as much as plural ultrafiltration membranes are provided.

(3) In a cleaning apparatus for removing filth from an article to be cleaned, still another cleaning apparatus according to the present invention comprises a first cleaning unit; and a second cleaning unit, wherein the first cleaning unit is formed according to a cleaning apparatus described in (1) while the second cleaning unit is formed according to a cleaning apparatus described in (2).

According to this structure of the cleaning apparatus, the principal cleaning is performed in the first cleaning unit having the backwash filtration system while rinsing can be performed in the second cleaning unit having plural ultrafiltration membranes, so that the extremely efficient cleaning can be consequently performed.

(4) In a cleaning method for removing filth from an article to be cleaned, a cleaning method according to the present invention comprises the steps of: cleaning the article to be cleaned in a cleaning vessel; storing the sewage discharged from the cleaning vessel in a concentrating vessel; separating the sewage discharged from the concentrating vessel into filtered water and concentrated sewage by an ultrafiltration membrane; returning the concentrated sewage discharged from the ultrafiltration membrane into the concentrating vessel; and flushing the ultrafiltration membrane backward with liquid from the filtered water side toward the sewage by a backwash filtration system.

(5) In a cleaning method for removing filth from an article to be cleaned, another cleaning method according to the present invention comprises the steps of: cleaning the article to be cleaned in a cleaning vessel; storing the sewage discharged from the cleaning vessel in a concentrating vessel; separating the sewage discharged from the concentrating vessel into filtered water and concentrated sewage by an ultrafiltration membrane; and returning the concentrated sewage discharged from the ultrafiltration membrane into the concentrating vessel, wherein a plurality of the ultrafiltration membranes are arranged in parallel with each other in a waterway line starting from the concentrating vessel.

(6) Still another cleaning method according to the present invention comprises the steps of: cleaning the article to be cleaned according to a method described in (4); and cleaning the article to be cleaned according to a method described in (5).

(7) A manufacturing method for a liquid crystal apparatus according to the present invention comprises a cleaning step of an article to be cleaned described in any one of items (4) to (6), wherein the article to be cleaned is an liquid crystal panel or the liquid crystal apparatus.

DETAILED DESCRIPTION OF THE PREFERRED EMBODIMENTS

Figure 1:
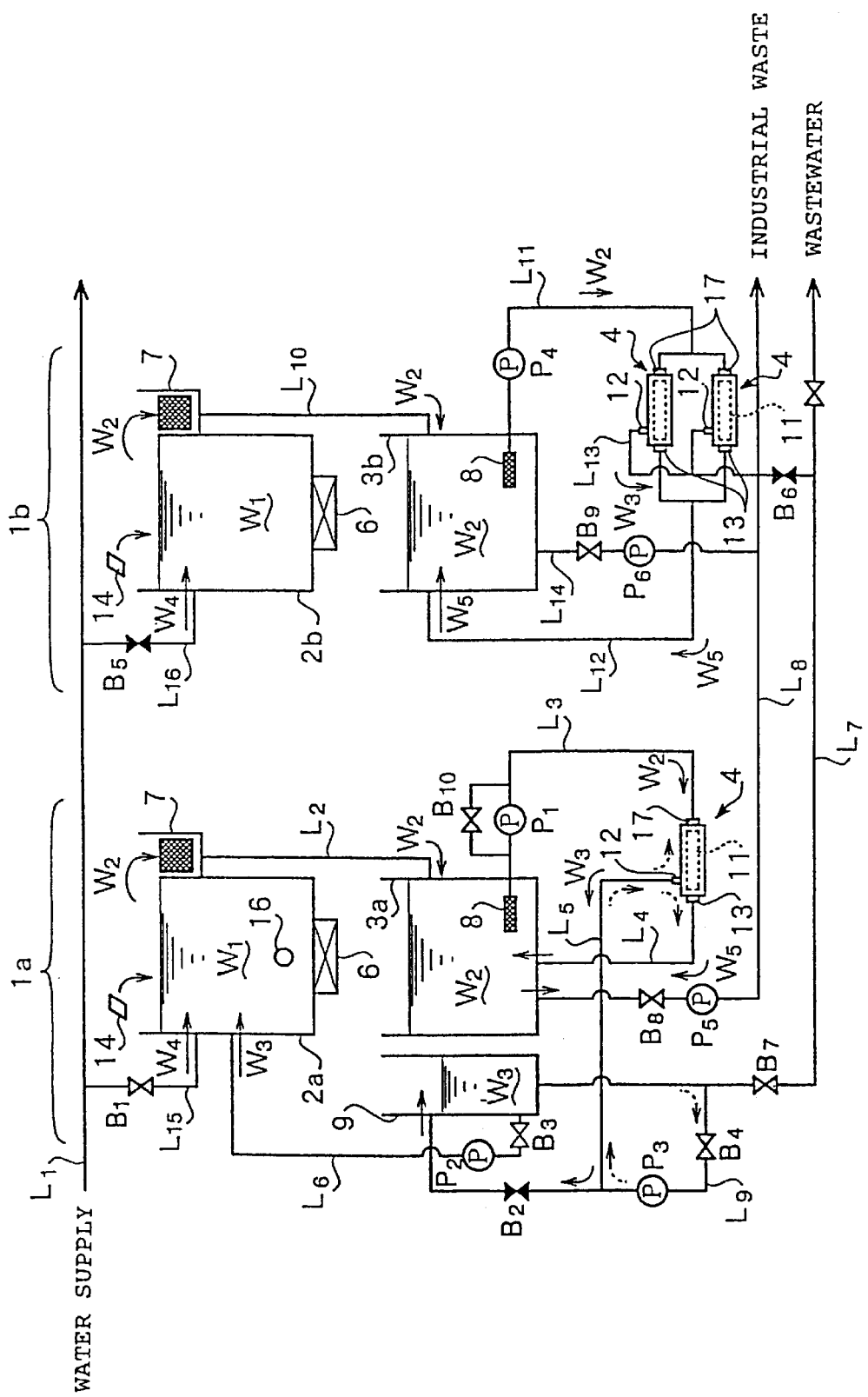
FIG. 1 is a drawing showing a cleaning apparatus according to an embodiment of the present invention.

FIG. 1 shows an embodiment of a cleaning apparatus according to the present invention. The cleaning apparatus shown in the drawing comprises a first cleaning unit 1a for principal cleaning and a second cleaning unit 1b for rinsing. The first cleaning unit 1a is formed of a first cleaning vessel 2a for storing cleaning water "W1", a concentrating vessel 3a for storing sewage "W2" overflowed thereinto, an ultrafilter 4 as filtration means, and a filter vessel 9 for storing filtered water "W3".

Between the first cleaning vessel 2a and a water supply line "L1", a waterway line "L15" comprising a solenoid valve (normally closed) "B1" is connected. When the solenoid valve "B1" is opened, water "W4" supplied from the water supply line "L1" through the solenoid valve "B1" flows into the first cleaning vessel 2a. Although the water "W4" is clean pure water (hot water) without filth, an article to be cleaned 14 is cleaned in the first cleaning vessel 2a, so that the cleaning water "W1" contains filth. Therefore, the cleaning water "W1" stored in the first cleaning vessel 2a is generally sewage containing filth.

The first cleaning vessel 2a is provided with an ultrasonic vibrator 6 and an overflow-water recovery unit 7 for collecting the cleaning water (sewage containing filth) overflowing from the first cleaning vessel 2a. Also, a heater 16 for heating the cleaning water "W1" is arranged inside the first cleaning vessel 2a.

The concentrating vessel 3a is connected to a waterway line "L2" extending from the overflow-water recovery unit 7 to receive the cleaning water overflowed from the first cleaning vessel 2a, which is the sewage "W2" containing filth, for storing it therein. The concentrating vessel 3a is provided with a water taking-out portion 8. A pump "P1" is arranged in a waterway line "L3" extending from the water taking-out portion 8. The waterway line "L3" is furthermore connected to an intake 17 for an ultrafilter 4. Also, a solenoid valve (normally closed) "B10" is arranged in parallel with the pump "P1".

Figure 2:
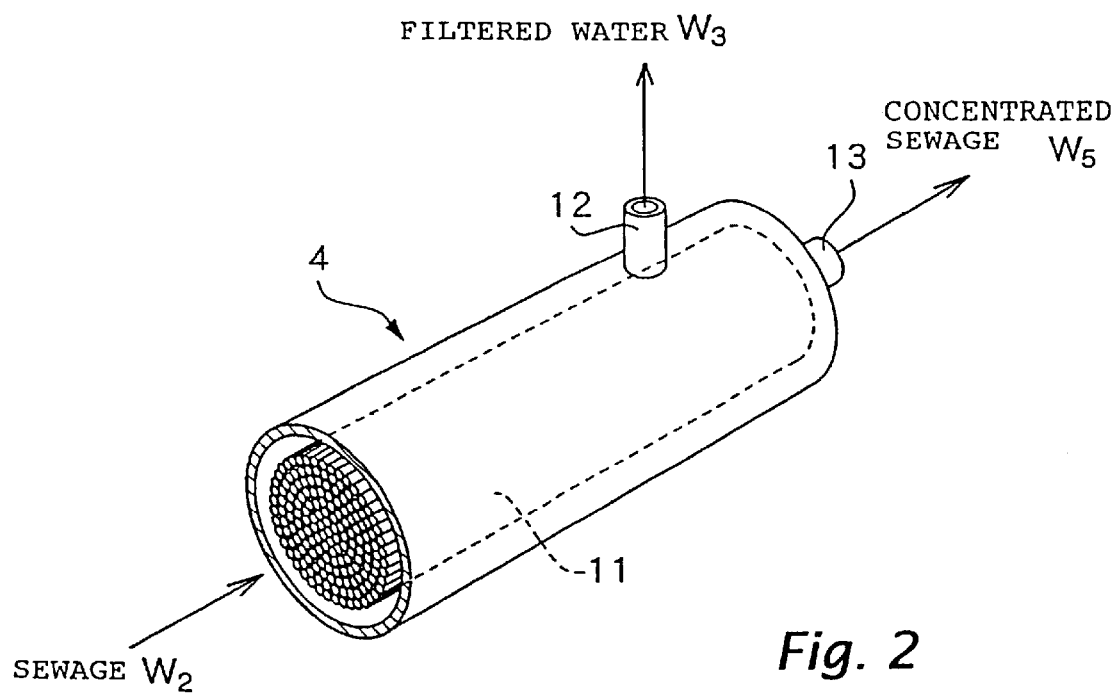
FIG. 2 is a partly cutaway view of an example of filtration means used in the cleaning apparatus shown in FIG. 1.

As shown in FIG. 2, for example, the ultrafilter 4 comprises numerous ultrafiltration membranes 11 bundled together, each membrane being formed to have a narrow straw shape. The ultrafiltration membranes 11 are arranged in a waterway of the sewage "W2". When the sewage "W2" flows through the ultrafiltration membranes 11, water is filtered through the membrane walls of the ultrafiltration membranes 11 from the sewage "W2" flowing under a predetermined water pressure. The filtered water "W3" filtered in such a manner is taken out from a first water outlet 12. On the other hand, the sewage having increased concentration of filth because the filtered water "W3" is taken out therefrom, i.e., concentrated sewage "W5", is taken out from a second water outlet 13.

In FIG. 1, the second water outlet 13 of the ultrafilter 4 is connected to the concentrating vessel 3a via a waterway line "L4". Thereby, the concentrated sewage "W5" drained from the second water outlet 13 is returned to the concentrating vessel 3a through the waterway line "L4", resulting in gradually increasing the filth concentration in the sewage "W2" contained in the concentrating vessel 3a.

On the other hand, the first water outlet 12 of the ultrafilter 4 is connected to the filter vessel 9 via a waterway line "L5". Thereby, the filtered water "W3" drained from the first water outlet 12 is contained into the filter vessel 9 through a solenoid valve (normally open) "B2". That is, in the filter vessel 9, the filtered water "W3" without filth entirely or substantially is stored.

The filter vessel 9 is connected to the first cleaning vessel 2a by a waterway line "L6". At midpoints in the waterway line "L6", a solenoid valve (normally closed) "B3" and a pump "P2" are arranged. When the solenoid valve "B3" is opened and the pump "P2" is sequentially operated, the filtered water "W3" in the filter vessel 9 is returned to the first cleaning vessel 2a. Thereby, the first cleaning vessel 2a can maintain a predetermined water level without usual water supply from the waterway line "L1".

To the filter vessel 9, a waste-waterway line "L7" for outwardly draining the filtered water "W3" in the vessel is connected via a solenoid valve (normally closed) "B7". Since the filtered water "W3" does not include filth entirely or substantially, the draining destination from the waste-waterway line "L7" may be an arbitrary place. Also, to the concentrating vessel 3a, a waste-liquid-way line "L8" is connected via a solenoid valve (normally closed) "B8" and a pump "P5". Since the filth included in the sewage "W2" in the concentrating vessel 3a may be environmentally harmful, the waste from the waste-liquid-way line "L8" is properly disposed of as industrial wastes.

In the first cleaning unit 1a, between the wastewaterway line "L7" extending from the filter vessel 9 and the waterway line "L5" extending from the first water outlet 12 of the ultrafilter 4 toward the filter vessel 9, there is provided a waterway line "L9" used for backwash operations for removing the filthy refuse deposited on the internal surfaces of the ultrafiltration membranes 11. At midpoints in the waterway line "L9", a solenoid valve (normally closed) "B4" and a pump "P3" are arranged.

In FIG. 1, the second cleaning unit 1b for rinsing comprises a second cleaning vessel 2b for storing the cleaning water "W1", a concentrating vessel 3b for storing the sewage "W2", and two ultrafilters 4 disposed in parallel with each other as filtration means.

Between the second cleaning vessel 2b and the water supply line "L1", a waterway line "L16" comprising a solenoid valve (normally open) "B5" is connected. Through the solenoid valve "B5", the water "W4" supplied from the water supply line "L1" flows into the second cleaning vessel 2b. Although the water "W4" is clean pure water (hot water) without filth, an article to be cleaned 14 is cleaned in the second cleaning vessel 2b, so that the cleaning water "W1" contains filth. Therefore, the cleaning water "W1" stored in the second cleaning vessel 2b is generally filthy sewage. The second cleaning vessel 2b is provided with an ultrasonic vibrator 6 and an overflow-water recovery unit 7 for collecting the cleaning water overflowed therefrom. However, a heater is not provided therein.

The concentrating vessel 3b is connected to a waterway line "L10" extending from the overflow-water recovery unit 7 to receive the cleaning water overflowed from the second cleaning vessel 2b, which is the sewage "W2" containing filth, for storing it therein. The concentrating vessel 3b is provided with a water taking-out portion 8. A pump "P4" is arranged in a waterway line "L11" extending from the water taking-out portion 8. The waterway line "L11" is furthermore connected to two ultrafilters 4 disposed in parallel with each other for increasing the filtration efficiency (capacity).

These ultrafilters 4 are of the same structure as that shown in FIG. 2, so that the description thereof is omitted. Second water outlets 13 of the ultrafilters 4 are connected to the concentrating vessel 3b via a waterway line "L12". Thereby, the concentrated sewage "W5" drained from the second water outlets 13 is returned to the concentrating vessel 3b through the waterway line "L12", resulting in gradually increasing the filth concentration in the sewage contained in the concentrating vessel 3b.

On the other hand, first water outlets 12 of the ultrafilters 4 are directly connected to the waste-waterway line "L7" by a waterway line "L13" comprising a solenoid valve (normally open) "B6". Also, the concentrating vessel 3b is connected to the waste-liquid-way line "L8" by a waterway line "L14" comprising a solenoid valve (normally closed) "B9" and a pump "P6".

The operation of the cleaning apparatus having the above-mentioned structure and the cleaning method thereby will be described below.

In FIG. 1, the first cleaning vessel 2a is filled with the cleaning water "W1" by opening the solenoid valve "B1" attached to the first cleaning vessel 2a in the first cleaning unit 1a so as to induce the water "W4" to flow into the first cleaning vessel 2a. Also, excess water overflowing from the first cleaning vessel 2a is induced to flow into the concentrating vessel 3a. The cleaning water "W1" is heated up to a predetermined temperature, about 40° C. for example, by operating the heater 16 within the first cleaning vessel 2a.

On the other hand, the second cleaning vessel 2b in the second cleaning unit 1b is filled with the cleaning water "W1" by inducing the water "W4" into the second cleaning vessel 2b via the solenoid valve "B5" attached to the second cleaning vessel 2b. Also, excess water overflowing from the second cleaning vessel 2b is induced to flow into the concentrating vessel 3b. The cleaning water "W1" in the second cleaning vessel 2b is maintained at room temperature without being heated.

In this state, into the cleaning water "W1" in the first cleaning vessel 2a is dipped an article to be cleaned 14 such as a glass substrate forming a liquid crystal panel, a liquid crystal panel formed by deposition of glass substrates or the liquid crystal panel being impregnated with liquid crystal, a liquid crystal apparatus as a product having a liquid crystal panel, or a jig used for manufacturing the liquid crystal apparatus so as to clean it. Since the cleaning is performed with hot water at about 40° C., filth adhering onto the article to be cleaned 14 is substantially and efficiently removed.

Then the article to be cleaned 14 is lifted out from the first cleaning vessel 2a to be further conveyed to the second cleaning unit 1b, wherein the article is dipped into the cleaning water "W1" in the second cleaning vessel 2b to be cleaned again. Thereby, the article to be cleaned 14 is rinsed so as to remove the filth substantially completely, resulting in achieving the expected cleaning.

When an article to be cleaned 14 is cleaned in the first cleaning vessel 2a in the first cleaning unit 1a, filth is dispersed in the cleaning water "W1". The cleaning water "W1" containing the filth brims over and overflows from the first cleaning vessel 2a to flow into the waterway line "L2" from the overflow-water recovery unit 7 so as to be recovered into the concentrating vessel 3a as the sewage "W2".

The sewage "W2" collected in such a manner is induced to the waterway line "L3" via the water taking-out portion 8 by the pump "P1" so as to be further supplied to the ultrafilter 4 via the intake 17. In the ultrafilter 4, the filtered water "W3" without filth is separated from the sewage "W2" by the function of the ultrafiltration membranes 11.

The filtered water "W3" is discharged from the first water outlet 12 via the waterway line "L5" into the filter vessel 9 so as to be stored therein. On the other hand, the residual filthy water after the separation of the filtered water "W3", i.e. the concentrated sewage "W5", is returned to the concentrating vessel 3a via the waterway line "L4".

The filth concentration in the sewage "W2" contained in the concentrating vessel 3a is gradually increased by repeating the treatment described above continuously. The filtered water "W3" in the filter vessel 9 also increases gradually in the amount.

When the filth concentration in the sewage "W2" in the concentrating vessel 3a reaches a predetermined value, the solenoid valve "B8" in the waste-liquid-way line "L8" is opened and the pump "P5" is sequentially operated so that the sewage "W2" in the concentrating vessel 3a is outwardly discharged via the waste-liquid-way line "L8" to be disposed of as industrial wastes in a prescribed manner. When the filtered water "W3" in the filter vessel 9 also reaches a predetermined amount, the solenoid valve "B3" in the waterway line "L6" is opened and the pump "P2" is sequentially operated so that the filtered water "W3" in the filter vessel 9 is returned to the first cleaning vessel 2a to be reused as the cleaning water "W1".

On the other hand, when an article to be cleaned 14 is cleaned in the second cleaning vessel 2b in the second cleaning unit 1b, filth is dispersed in the cleaning water "W1". To the second cleaning vessel 2b, the water "W4" is usually supplied via the waterway line "L16", so that the sewage "W2" containing the filth correspondingly overflows from the second cleaning vessel 2b to flow into the waterway line "L10" from the overflow-water recovery unit 7 so as to be collected into the concentrating vessel 3b. At this time, the filth concentration in the sewage "W2" is extremely smaller in comparison with the filth concentration in the sewage "W2" in the first cleaning unit 1a.

The sewage "W2" collected in such a manner is induced to the waterway line "L11" via the water taking-out portion 8 by the pump "P4" so as to be further supplied to the respective two ultrafilters 4. In the ultrafilters 4, the filtered water "W3" without filth is separated from the sewage "W2" by the function of the ultrafiltration membranes 11. Since the filtered water "W3" does not substantially include filth completely, it is outwardly discharged as it is via the waste-waterway line "L7". The second cleaning unit 1b is provided with the two ultrafilters 4, so that the filtration capacity is large enabling a large amount of the sewage "W2" to be treated for a short time.

The residual filthy water after the separation of the filtered water "W3", i.e. the concentrated sewage "W5", is returned to the concentrating vessel 3b via the waterway line "L12". The filth concentration in the sewage "W2" contained in the concentrating vessel 3b is gradually increased during the continuous cleaning of articles to be cleaned 14. When the filth concentration reaches a predetermined value, the solenoid valve "B9" in the waterway line "L14" is opened and the pump "P6" is sequentially operated so that the sewage "W2" in the concentrating vessel 3b is outwardly discharged via the waste-liquid-way line "L8" to be disposed of as industrial wastes in a prescribed manner.

As described above, according to the cleaning apparatus of this embodiment, the cleaning is performed with water without using harmful liquid such as a fluorocarbon or a specific detergent, so that there are no worries of external environmental pollution. Since the concentrated sewage "W5" discharged from the filtration means such as the ultrafilter is returned to the concentrating vessels 3a and 3b, the filth such as unnecessary liquid crystal can be securely prevented from being externally discharged, and moreover an amount of waste liquid can be extremely reduced.

By the way, when the cleaning operations are repeatedly performed in the first cleaning unit 1a, filthy refuse may settle on the internal surface of the ultrafiltration membrane 11 in the ultrafilter 4 to reduce the separating capacity of the filtered water. In order to solve the problem, the following backwash filtration operations are performed.

That is: the solenoid valve "B2" for taking in the filtered water in the filter tank side is closed; the solenoid valve "B7" for discharging the filtered water is closed; the solenoid valve "B10" disposed in parallel with the pump "P1" in the vicinity of the water taking-out portion 8 of the concentrating vessel 3a is opened; the solenoid valve "B4" in the waterway line "L9" for backwash filtration is further opened; then the filtered water "W3" in the filter vessel 9 is induced into the waterway line "L9" by operating the pump "P3".

The induced filtered water "W3" flows backward in the waterway line "L5" to enter the internal portions of the filtration membranes 11 from the first water outlet 12 of the ultrafilter 4; thereby, filthy refuse deposited on the internal surfaces of the membranes is washed away externally through the second water outlet 13 and the intake 17 of the ultrafilter 4 so as to clean the filtration membranes 11. In addition, the backwash filtration system using the waterway line "L9" is provided only in the first cleaning unit 1a in the embodiment; however, it may also be provided in the second cleaning unit 1b.

The present invention has been described above according to a preferred embodiment by way of example; however it is not limited to the embodiment and various modifications can be made within the scope of the invention described in the attached claims.

For example, in the embodiment shown in FIG. 1, the two first and second cleaning units 1a and 1b are used; however the case in which any one of them is used is included in the present invention.

The filtration means for separating the filtered water from the sewage is not limited to the structure of the ultrafilter 4 shown in FIG. 2; another structure thereof may be used; furthermore, any arbitrary type of filter except the ultrafilter may be used.

Also, in the first cleaning unit 1a shown in FIG. 1, the filter vessel 9 is provided in the first water outlet 12 of the ultrafilter 4; the filtered water may be directly returned to the first cleaning vessel 2a from the ultrafilter 4 without providing the filter vessel 9.

According to the present invention, the cleaning is performed with water without using harmful liquid such as a fluorocarbon or a specific detergent, so that there are no worries of external environmental pollution. The filth in the circulating cleaning liquid being repeatedly used can be efficiently and securely removed therefrom for a long period. Thereby, an article to be cleaned can be cleaned with substantially pure water at all times. Also, an article to be cleaned can be sufficiently cleaned with fresh cleaning liquid having a small amount of filth.

What is claimed is:

1. A cleaning apparatus for removing filth from an article to be cleaned, said cleaning apparatus comprising:

a cleaning vessel for storing cleaning water used for cleaning said article to be cleaned;

a concentrating vessel for storing sewage discharged from said cleaning vessel;

a filtration membrane for receiving filthy water discharged from said concentrating vessel to separate the received filthy water into filtered water and concentrated filthy water;

a waterway line for returning the concentrated filthy water discharged from said filtration membrane to said concentrating vessel; and a storing vessel for storing filtered water from the filtration membrane and returning the filtered water to said cleaning vessel, the storing vessel being connected to said cleaning vessel through a valve for maintaining a predetermined water level in said cleaning vessel.

2. The cleaning apparatus according to claim 1, wherein said storing vessel is connected to a waste-waterway line for outwardly draining.

3. A cleaning apparatus for removing filth from an article to be cleaned, said cleaning apparatus comprising:

a first cleaning unit including a cleaning vessel for storing cleaning water used for cleaning article to be cleaned;

a concentrating vessel for storing sewage discharged from said cleaning vessel;

an ultrafiltration membrane for receiving the sewage discharged from said concentrating vessel to separate the received sewage into filtered water and concentrated sewage;

a waterway line for returning the concentrated sewage discharged from said ultrafiltration membrane to said concentrating vessel;

a backwash filtration system for flushing said ultrafiltration membrane backward with liquid from a filtered water side toward the sewage;

a second cleaning unit including a second cleaning vessel for storing cleaning water used for cleaning said article to be cleaned;

a second concentrating vessel for storing sewage discharged from said cleaning vessel;

a plurality of second ultrafiltration membranes for receiving the sewage discharged from said second concentrating vessel to separate the received sewage into filtered water and concentrated sewage; and a waterway line for returning the concentrated sewage discharged from said second ultrafiltration membrane to said second concentrating vessel, wherein the plurality of the second ultrafiltration membranes are arranged in parallel with each other in a waterway line starting from said second concentrating vessel.

4. A cleaning method for cleaning an article to be cleaned, said cleaning method comprising the steps of:

cleaning said article to be cleaned in a cleaning vessel;

storing sewage discharged from said cleaning vessel in a concentrating vessel;

separating the sewage discharged from said concentrating vessel into filtered water and concentrated sewage by an ultrafiltration membrane;

returning the concentrated sewage discharged from said ultrafiltration membrane into said concentrating vessel;

flushing said ultrafiltration membrane backward with liquid from a filtered water side toward the sewage by a backwash filtration system;

cleaning said article to be cleaned in a second cleaning vessel;

storing sewage discharged from said second cleaning vessel in a second concentrating vessel;

separating the sewage discharged from said second concentrating vessel into filtered water and concentrated sewage by a plurality of second ultrafiltration membranes; and returning the concentrated sewage discharged from said second ultrafiltration membranes into said second concentrating vessel, wherein the plurality of said second ultrafiltration membranes are arranged in parallel with each other in a waterway line starting from said second concentrating vessel.

5. A method of cleaning a liquid crystal panel comprising the steps of:

cleaning a liquid crystal panel to be cleaned in a cleaning vessel;

storing filthy water discharged from said cleaning vessel in a concentrating vessel;

separating the filthy water discharged from said concentrating vessel into filtered water and concentrated filthy water by a filtration membrane;

returning the concentrated filthy water discharged from said filtration membrane into said concentrating vessel;

flushing said filtration membrane backward with liquid from a filtered water side toward the filtered water by a backwash filtration system;

cleaning said liquid panel to be cleaned in a second cleaning vessel;

storing filthy water discharged from said second cleaning vessel in a second concentrating vessel;

separating the filthy water discharged from said second concentrating vessel into filtered water and concentrated filthy water by a plurality of second filtration membranes, wherein the plurality of said second filtration membranes are arranged in parallel with each other in a waterway line starting from said second concentrating vessel; and returning the concentrated filthy water discharged from said second filtration membranes into said second concentrating vessel.

6. A cleaning apparatus for removing filth from an article to be cleaned, said cleaning apparatus comprising:

a first cleaning unit for removing filth from the article to be cleaned, said first cleaning unit including:

a cleaning vessel for storing cleaning water used for cleaning said article;

a concentrating vessel for storing filthy water discharged from said cleaning vessel;

filtration means for receiving the filthy water discharged from said concentrating vessel to separate the received filthy water into filtered water and concentrated filthy water; and a waterway line for returning the concentrated filthy water discharged from said filtration means to said concentrating vessel; and a second cleaning unit including:

a second cleaning vessel for storing cleaning water used for cleaning said article;

a second concentrating vessel for storing filthy water discharged from said second cleaning vessel;

second filtration means for receiving the filthy water discharged from said second concentrating vessel to separate the received filthy water into filtered water and concentrated filthy water; and a second waterway line for returning the concentrated filthy water discharged from said second filtration means to said second concentrating vessel.

7. The cleaning apparatus according to claim 6, wherein the second filtration means has a plurality of filtration membranes which are arranged in parallel with each other in the second waterway line starting from said second concentrating vessel.

* * * * *

UNITED STATES PATENT AND TRADEMARK OFFICE
Certificate

Patent No. 6,589,358 B1

Patented: July 8, 2003

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Keiichi Suehiro, Matsumoto, Japan; and Kenji Masuda, Suwa, Nagano, Japan.

Signed and Sealed this Thirtieth Day of March 2004.

RANDY GULAKOWSKI
*Supervisory Patent Examiner*
Art Unit 1746

UNITED STATES PATENT AND TRADEMARK OFFICE
CERTIFICATE OF CORRECTION

PATENT NO. : 6,589,358 B1
DATED : July 8, 2003
INVENTOR(S) : Keiichi Suehiro

It is certified that error appears in the above-identified patent and that said Letters Patent is hereby corrected as shown below:

Column 2,
Line 5, delete "the using" and insert -- use of -- therefor
Line 48, after "manufacturing" insert -- of --

Column 6,
Line 66, ""W2" should be -- "W2" --

Column 7,
Line 39, ""W2" should be -- "W2" --

Signed and Sealed this

Eleventh Day of May, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,589,358 B1
DATED : July 8, 2003
INVENTOR(S) : Keiichi Suehiro

It is certified that error appears in the above-identified patent and that said Letters Patent is hereby corrected as shown below:

Column 2,
Line 5, delete "the using" and insert -- use of -- therefor
Line 48, after "manufacturing" insert -- of --

Column 6,
Line 66, " "W2 " should be -- "W2" --

Column 7,
Line 39, " "W2 " should be -- "W2" --

Signed and Sealed this

Third Day of August, 2004

JON W. DUDAS
*Acting Director of the United States Patent and Trademark Office*